United States Patent
Sun et al.

(10) Patent No.: US 9,130,681 B2
(45) Date of Patent: Sep. 8, 2015

(54) REDUCING PHASE NOISE ASSOCIATED WITH OPTICAL SOURCES

(71) Applicants: Han H. Sun, Ottowa (CA); John D. McNicol, Ottawa (CA); Kuang-Tsan Wu, Ottawa (CA)

(72) Inventors: Han H. Sun, Ottowa (CA); John D. McNicol, Ottawa (CA); Kuang-Tsan Wu, Ottawa (CA)

(73) Assignee: Infinera Corporation, Sunnyvale, CA (US)

( * ) Notice: Subject to any disclaimer, the term of this patent is extended or adjusted under 35 U.S.C. 154(b) by 66 days.

(21) Appl. No.: 13/851,574

(22) Filed: Mar. 27, 2013

(65) Prior Publication Data

US 2014/0328584 A1 Nov. 6, 2014

(51) Int. Cl.
H04B 10/50 (2013.01)
H04J 14/02 (2006.01)
H04B 10/61 (2013.01)
H04B 10/58 (2013.01)

(52) U.S. Cl.
CPC .......... H04B 10/6165 (2013.01); H04B 10/506 (2013.01); H04B 10/58 (2013.01); H04J 14/02 (2013.01)

(58) Field of Classification Search
CPC .. H04B 10/5057; H04B 10/506; H04B 10/58; H04B 10/6165; H04J 14/02
USPC ................................................. 398/195–198
See application file for complete search history.

(56) References Cited

U.S. PATENT DOCUMENTS

| 4,805,235 | A | * | 2/1989 | Henmi | 398/195 |
|---|---|---|---|---|---|
| 5,025,487 | A | * | 6/1991 | Eichen | 398/201 |
| 5,317,443 | A | * | 5/1994 | Nishimoto | 398/195 |
| 5,541,755 | A | * | 7/1996 | Noe et al. | 398/195 |
| 5,929,430 | A | * | 7/1999 | Yao et al. | 250/205 |
| 8,693,867 | B2 | * | 4/2014 | Littler et al. | 398/32 |
| 2006/0078339 | A1 | * | 4/2006 | Ng et al. | 398/195 |

* cited by examiner

*Primary Examiner* — Leslie Pascal
(74) *Attorney, Agent, or Firm* — Harrity & Harrity LLP; David L. Soltz (57) ABSTRACT

An optical transmitter may include an optical source to provide a first optical signal having a varying frequency; an optical circuit to receive a portion of the first optical signal and provide a second optical signal corresponding to a change in frequency of the first optical signal; a photodetector to receive the first optical signal and provide an electrical signal that is indicative of the change in frequency of the first optical signal; an integrator to receive the electrical signal and provide an inverted electrical signal; and a controller to process the inverted electrical signal and provide a current, associated with the inverted electrical signal, to the optical source. The optical source may reduce the phase noise associated with the first optical signal based on the current.

18 Claims, 7 Drawing Sheets

REDUCING PHASE NOISE ASSOCIATED WITH OPTICAL SOURCES

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrate circuit (PIC) having a transmitter component that includes a laser associated with each wavelength, a modulator that modulates the output of the laser, and a multiplexer that combines each of the modulated outputs (e.g., to form a combined output or WDM signal).

A WDM system may also include a receiver circuit having a receiver (Rx) PIC. The receiver PIC may include an optical demultiplexer circuit (referred to as a "demultiplexer") that receives an optical signal and demultiplexes the optical signal into individual optical signals. Additionally, the receiver circuit may include receiver components that convert the individual optical signals into electrical signals, and output the data carried by those electrical signals. The receiver components may include an optical source, such as a local oscillator (e.g., a laser device), to provide an optical signal used to modify a frequency of the individual optical signals provided by the demultiplexer.

The Tx and Rx PICs, in an optical communication system, may support communications over a number of wavelength channels. For example, a pair of Tx/Rx PICs may support ten channels, each spaced by, for example, 200 GHz. The set of channels supported by the Tx and Rx PICs can be referred to as the channel grid for the PICs. Channel grids for Tx/Rx PICs may be aligned to standardized frequencies, such as those published by the Telecommunication Standardization Sector (ITU-T). The set of channels supported by the Tx and Rx PICs may be referred to as the ITU frequency grid for the Tx/Rx PICs.

An optical source (e.g., a laser component in a Tx PIC and/or a local oscillator component in an Rx PIC) sometimes produces a level of phase noise in an optical signal provided by the optical source. The phase noise often interferes in the modulation, transmission, and/or processing of an optical signal, particularly when a WDM system includes a compensation system (e.g., a digital filter) to compensate for signal dispersion (e.g., chromatic dispersion and/or some other type of dispersion). Lower frequency portions of the optical signal phase noise spectrum, in particular, sometimes cause substantial performance penalties in transmission of the optical signal (e.g., higher bit rate errors during processing of the optical signal).

SUMMARY

According to some possible implementations, an optical transmitter may include an optical source to provide a first optical signal having a varying frequency; an optical circuit to receive a portion of the first optical signal and provide a second optical signal corresponding to a change in frequency of the first optical signal; a photodetector to receive the first optical signal and provide an electrical signal that is indicative of the change in frequency of the first optical signal; an integrator to receive the electrical signal and provide an inverted electrical signal; and a controller to process the inverted electrical signal and provide a current, associated with the inverted electrical signal, to the optical source. The optical source may reduce phase noise, associated with the first optical signal, based on the current.

According to some possible implementations, an optical receiver may include an optical source to provide a first optical signal having a varying frequency; an optical circuit to receive a portion of the first optical signal and provide a second optical signal corresponding to a change in frequency of the first optical signal; a photodetector to receive the first optical signal and provide an electrical signal that is indicative of the change in frequency of the first optical signal; an integrator to receive the electrical signal and provide an inverted electrical signal; and a controller to process the inverted electrical signal and provide a current, associated with the inverted electrical signal, to the optical source. The optical source may reduce phase noise, associated with the first optical signal, based on the current.

According to some possible implementations, an optical system may include an optical transmitter having a first optical source to provide a first optical signal, having a varying frequency; a first optical circuit to receive a portion of the first optical signal and provide a second optical signal corresponding to a change in frequency of the first optical signal; a first photodetector to receive the second optical signal and provide a first electrical signal that is indicative of the change in frequency of the first optical signal; a first integrator to receive the first electrical signal and provide a first inverted electrical signal; a first controller to process the first inverted electrical signal and provide a first current, associated with the first inverted electrical signal, to the first optical source. The first optical source may reduce phase noise, associated with the first optical signal, based on the first current.

The optical system may further include an optical receiver having a second optical source configured to provide a third optical signal the having a varying frequency; a second optical circuit to receive a portion of the third optical signal and provide a fourth optical signal corresponding to a change in frequency of the third optical signal; a second photodetector configured to receive the fourth optical signal and provide a second electrical signal that is indicative of the change in frequency of the third optical signal; a second integrator to receive the second electrical signal and provide a second inverted electrical signal; and a second controller configured to process the second inverted electrical signal and provide a second current, associated with the second inverted electrical signal, to the second optical source. The second optical source may reduce phase noise, associated with the third optical signal, based on the second current.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar components. Also, the following detailed description does not limit the disclosure.

Systems and/or methods, as described herein, may detect and reduce phase noise, associated with an optical signal provided by an optical source, such as a laser, a local oscillator, or the like. For example, the systems and/or methods may provide the optical source with a feedback current that may substantially reduce phase noise produced by the optical source.

In some implementations, the optical source may provide an optical signal, a portion of which may be provided to a frequency change detection device (e.g., an interferometer, a 90-degree hybrid circuit, or the like) and converted into an electrical signal (e.g., via photodetectors) that may be indicative of a change in frequency of the optical signal provided by the optical source. In some implementations, an integrator and a controller may process the electrical signal to invert the electrical signal and to form a current that is provided to the optical source. In some implementations, the current may substantially reduce and/or offset phase noise produced by the optical source when the current is provided to the optical source. In some implementations, the electrical signal may be used to measure phase noise for diagnostic and/or monitoring purposes.

In some implementations, the phase noise may be reduced without a reduction in a line-width associated with the optical signal, thereby simplifying phase noise reduction in relation to when line-widths are reduced (which may exacerbate photonic integration and/or increase costs). In some implementations, phase noise may be reduced at a frequency that may cause substantial performance penalties in transmission of the optical signal (e.g., high bit rate errors during processing of the optical signal). For example, the phase noise may be reduced at a 100 megahertz (100 MHz) frequency, a 200 MHz frequency, and/or some other frequency. In some implementations, the systems and/or methods may include a digital recovery to track existing phase noise (e.g., phase noise that remains after providing the optical source with the current).

Figure 1:
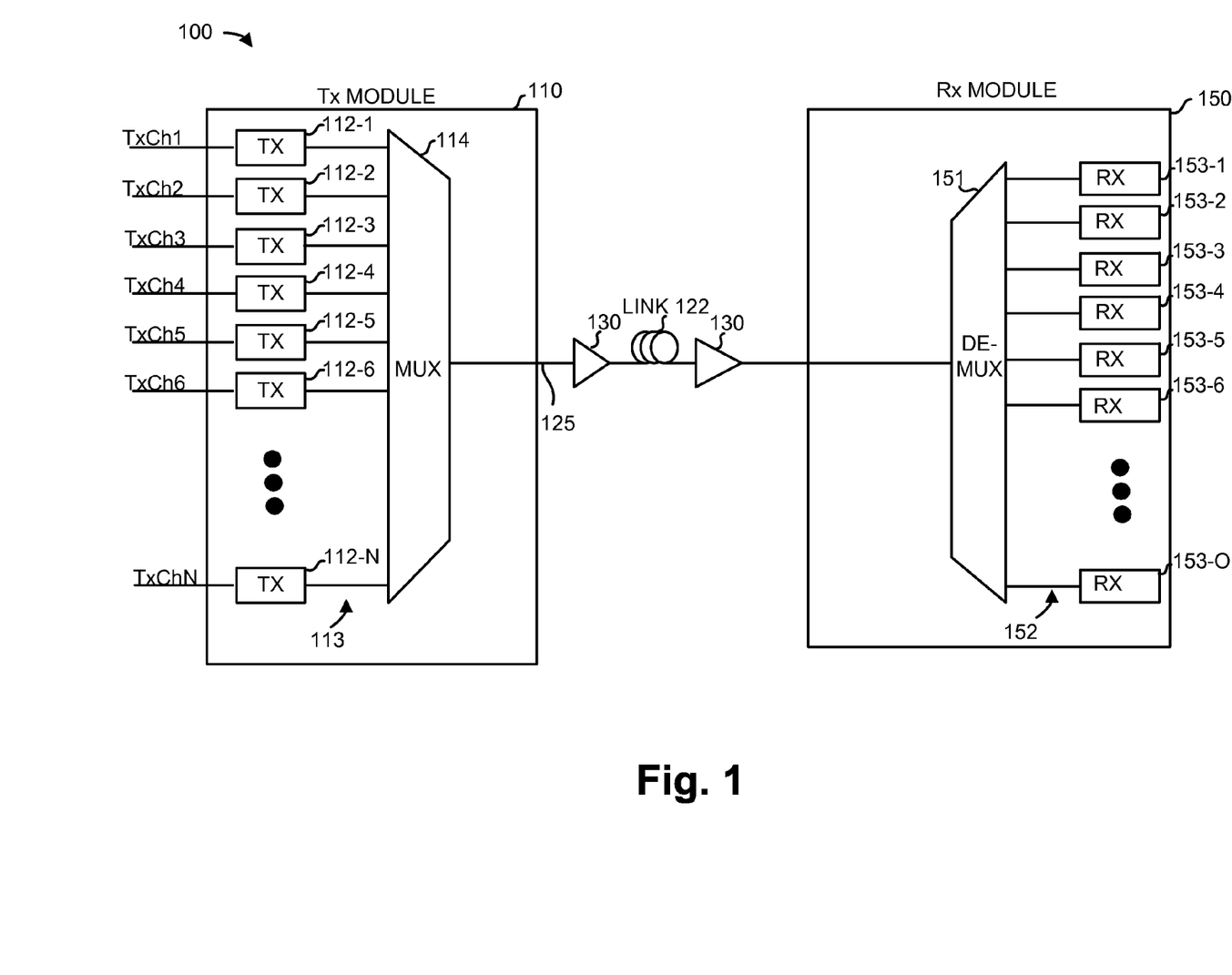
FIG. 1 is a diagram of an example network in which systems and/or methods may be implemented.

FIG. 1 is a diagram of an example network 100 in which systems and/or methods described herein may be implemented.

As illustrated in FIG. 1, network 100 may include transmitter (Tx) module 110 (e.g., a Tx PIC) and/or receiver (Rx) module 150 (e.g., an Rx PIC). In some implementations, transmitter module 110 may be optically connected to receiver module 150 via link 122, and/or optical amplifiers 130. Link 122 may include one or more optical amplifiers 130 that amplify an optical signal as the optical signal is transmitted over link 122.

Transmitter module 110 may include a number of optical transmitters 112-1 through 112-N (where N≥1), waveguides 113, and/or optical multiplexer 114. Each optical transmitter 112 may receive a data channel (TxCh1 through TxChN), modulate the data channel with an optical signal, and transmit the data channel as an optical signal. In one implementation, transmitter module 110 may include 5, 10, 20, 50, 100, or some other number of optical transmitters 112. Each optical transmitter 112 may be tuned to use an optical carrier of a designated wavelength. It may be desirable that the grid of wavelengths emitted by optical transmitters 112 conform to a known standard, such as a standard published by the Telecommunication Standardization Sector (ITU-T).

In some implementations, each of optical transmitters 112 may include a laser, a modulator, a coupler, an interferometer, a hybrid circuit, a semiconductor optical amplifier (SOA), and/or some other components. The laser, modulator, and/or SOA may be coupled with a tuning component (e.g., a heater) that can be used to tune the wavelength of the optical signal channel output by the laser, modulator, or SOA. In some implementations, a single laser may be shared by multiple optical transmitters 112. In some implementations, optical transmitter 112 may provide a feedback current to the laser, included in optical transmitter 112, to modulate an optical signal, provided by the laser, and reduce phase noise associated with the optical signal. Further operations and configurations of optical transmitter 112 are described below with respect to FIGS. 2A-2B.

Waveguides 113 may include an optical link to transmit modulated outputs (referred to as "signal channels") of optical transmitters 112. In some implementations, each optical transmitter 112 may connect to one waveguide 113 or to multiple waveguides 113 to transmit signal channels of optical transmitters 112 to optical multiplexer 114. In some implementations, waveguides 113 may be made from a birefringent material and/or some other material.

Optical multiplexer 114 may include an arrayed waveguide grating (AWG) or some other multiplexing device. In some implementations, optical multiplexer 114 may combine multiple signal channels, associated with optical transmitters 112, into a wave division multiplexed (WDM) signal, such as optical signal 125.

As further shown in FIG. 1, receiver module 150 may include optical demultiplexer 151, waveguides 152, and/or optical receivers 153-1 through 153-O (where O≥1). In some implementations, optical demultiplexer 151 may include an AWG or some other device. Optical demultiplexer 151 may supply multiple signal channels based on a received WDM signal (e.g., optical signal 125). As shown in FIG. 1, optical demultiplexer 151 may supply signal channels to optical receivers 153 via waveguides 152.

Waveguides 152 may include optical links to transmit outputs of optical demultiplexer 151 to optical receivers 153. In some implementations, each optical receiver 153 may receive outputs via a single waveguide 152 or via multiple waveguides 152. In some implementations, waveguides 152 may be birefringent (e.g., based on the width of waveguides 152).

Optical receivers 153 may each operate to convert the input optical signal to an electrical signal that represents the transmitted data. In some implementations, optical receivers 153 may each include one or more local oscillators, couplers, 90-degree hybrid circuits, analog-to-digital converters (ADCs), digital signal processors, photodetectors, amplifiers, and/or related devices to receive respective input optical signals outputted by optical demultiplexer 151, convert the signals to a photocurrent, and provide a voltage output to function as an electrical signal representation of the original input signal. In some implementations, optical receiver 153 may provide a feedback current to a local oscillator, included in optical receiver 153, to modulate an optical signal, provided by the local oscillator, and reduce phase noise associated with the optical signal. Further operations and configurations of optical receiver 153 are described below with respect to FIGS. 3A-3B.

While FIG. 1 shows a particular configuration of components in network 100, in practice, network 100 may include additional components, different components, or differently arranged components than what are shown in FIG. 1.

Figure 2A:
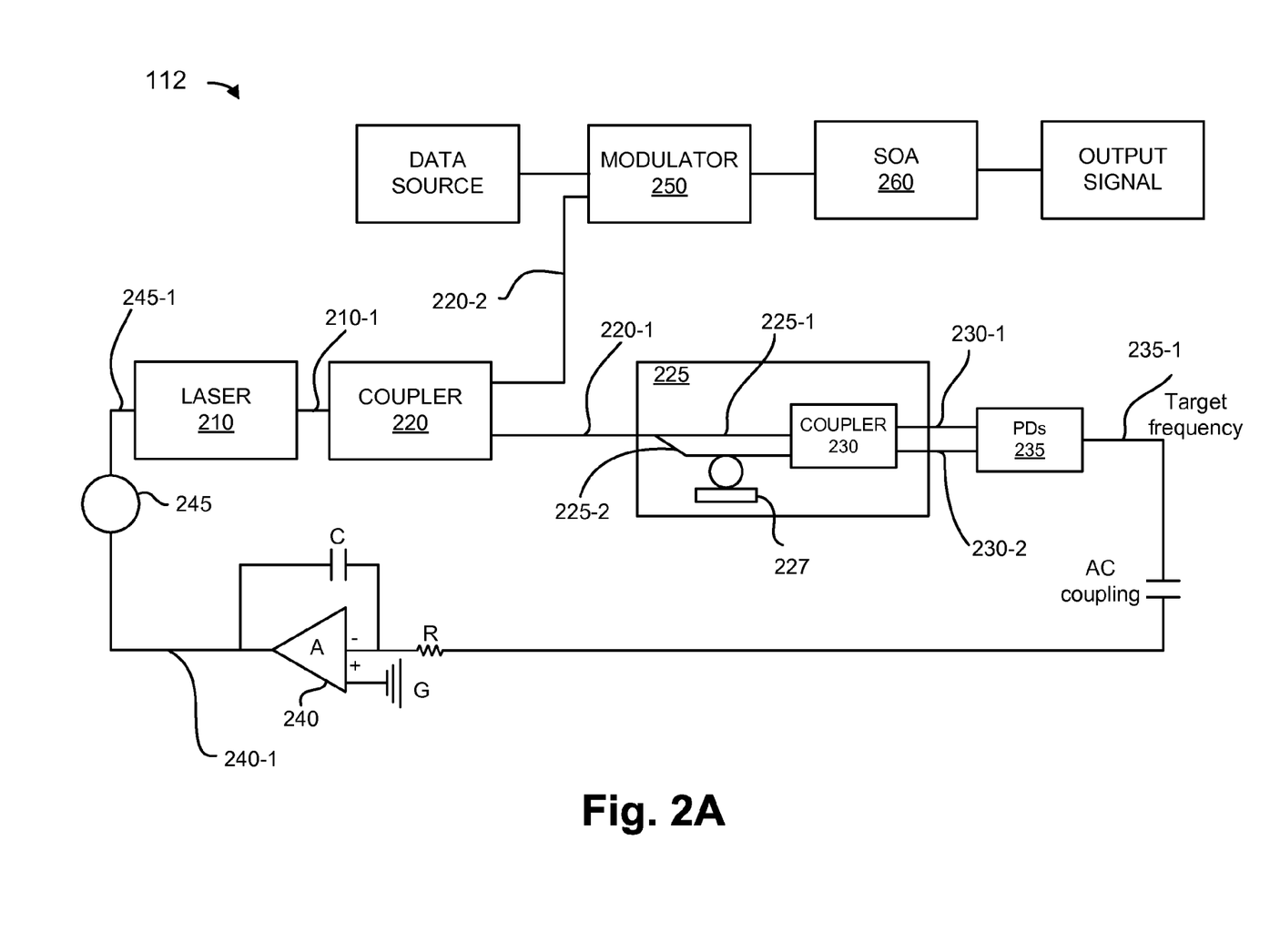
FIGS. 2A-2B are diagrams illustrating example components of an optical transmitter as shown in FIG. 1.

FIG. 2A is a diagram illustrating example components of optical transmitter 112 as shown in network 100 of FIG. 1. As shown in FIG. 2A, optical transmitter 112 may include laser 210, coupler 220, interferometer 225, photodetectors (PDs) 235, integrator 240, controller 245, modulator 250, and/or SOA 260. In some implementations, components of optical transmitter 112 may provide a feedback current to laser 210 to reduce phase noise associated with an optical signal provided by laser 210.

Laser 210 may include a semiconductor laser, such as a distributed feedback (DFB) laser, or some other type of laser. Laser 210 may provide an output optical light (e.g., a laser optical signal) to coupler 220 (e.g., via waveguide 210-1). In some implementations, laser 210 may be an optical source for a single corresponding optical transmitter 112. In some implementations, laser 210 may be an optical source that is shared by multiple optical transmitters 112.

Coupler 220 may include an optical power coupler (e.g., a 3 dB coupler), an optical power splitter (e.g., a 3 dB splitter), a combined power coupler/splitter device, or some other type of optical device. In some implementations, coupler 220 may receive an optical signal (e.g., a laser optical signal provided by laser 210, via waveguide 210-1), and may provide a portion of the laser optical signal to modulator 250 (e.g., via waveguide 220-2) and another portion of the laser optical signal to interferometer 225 (e.g., via waveguide 220-1).

Interferometer 225 may include an optical balanced delay-line interferometer device, or some other type of device to detect a change in frequency of an optical signal. In some implementations, interferometer 225 may convert changes in the instantaneous frequency of the laser optical signal into a voltage while being substantially unresponsive to changes in laser intensity (e.g., as a result of balance properties in interferometer 225). In some implementations, interferometer 225 may include waveguide 225-1, waveguide 225-2, heater 227, and coupler 230). In some implementations, waveguides 225-1 and 225-2 may each receive a portion of the laser optical signal provided by waveguide 220-1. The portions of the laser optical signal may each propagate in waveguides 225-1 and 225-2 such that the portion of the laser optical signal that propagates in waveguide 225-2 is delayed relative to the portion of the laser optical signal that propagates in waveguide 225-1.

For example, as shown in FIG. 2A, waveguide 225-2 may include a looped portion (e.g., to increase the optical length of waveguide 225-2) such that the portion of the laser optical signal that propagates in waveguide 225-2 is delayed relative to the portion of the laser optical signal that propagates in waveguide 225-1. In some implementations, the delayed propagation may correspond to a frequency difference between the two portions of the laser optical signal. In some implementations, heater 227 may be provided to adjust a length and/or a refractive index (and thus the optical length) of waveguide 225-2 (e.g., to cause a delay in propagation).

In some implementations, respective optical signals traveling in waveguides 225-1 and 225-2 may be provided to coupler 230. Coupler 230 may combine the optical signals to form a combined optical signal and may provide first and second portions of the combined optical signal to PDs 235 (e.g., via waveguides 230-1 and 230-2). In some implementations, the first portion may correspond to the sum of the optical signals traveling in waveguides 225-1 and 225-2. In some implementations, the second portion may correspond to the difference between the optical signals traveling in waveguides 225-1 and 225-2.

PDs 235 may include one or more photodetectors (e.g., a balanced pair of photodetectors) to receive optical signals and convert the optical signal to corresponding voltage signals. In some implementations, PDs 235 may include multiple detectors to process in-phase signals and quad-phase signals.

As shown in FIG. 2A, PDs 235 may receive optical signals, provided by coupler 230, via waveguides 230-1 and 230-2. In some implementations, PDs 235 may output an electrical signal corresponding to the received optical signals (e.g., via link 235-1). In some implementations, the electrical signal, provided by PDs 235, may include a current or voltage corresponding to an optical electric field of the combined optical signal provided by coupler 230 (e.g., the combined optical signal associated with waveguides 230-1 and 230-2).

In some implementations, the electrical signal provided by PDs 235 may be indicative of a change in the frequency of the laser optical signal provided by laser 210. In some implementations, the electrical signal may be used to produce an opposite current that may offset phase noise produced by laser 210 (e.g., when the current is provided to laser 210, as described in greater detail below). In some implementations, the electrical signal, provided by PDs 235, may be provided via link 235-1 to integrator 240 (e.g., via an alternating current (AC)-coupled connection).

Integrator 240 may include an amplification device, such as an inverting amplifier, or some other type of amplifier. In some implementations, integrator 240 may include an input resistor (R), a feedback capacitor (C), a ground connection (G), and an amplifier (A). In some implementations, integrator 240 may receive the electrical signal provided by PDs 235 and may invert the electrical signal (e.g., via a feedback control loop) to produce an inverted electrical signal having an opposite current as the electrical signal provided by PDs 235. As later described, the current of the inverted electrical signal may be used to modulate an instantaneous laser current to reduce and/or offset phase noise produced by laser 210 when laser 210 provides a laser optical signal. In some implementations, integrator 240 may amplify and provide the inverted electrical signal for transmission to controller 245.

Controller 245 may include a current controlling device or a collection of current controlling devices. In some implementations, controller 245 may receive the inverted electrical signal from integrator 240 (e.g., via link 240-1), may process the inverted electrical signal, and may provide a current (e.g., via link 245-1), associated with the inverted electrical signal, to laser 210. In some implementations, controller 245 may include a summing junction to add an AC current of the inverted electrical signal, to a DC current portion of the laser optical signal to process the inverted electrical signal.

As further shown in FIG. 2A, laser 210 may receive the current, which may cause laser 210 to reduce and/or offset phase noise produced by laser 210. For example, because the current, provided to laser 210, is opposite of a current, associated with the electrical signal provided by PDs 235 (e.g., the electrical signal that is indicative of a change in frequency of the laser optical signal), the current may modulate the laser optical signal such that the phase noise of the laser optical signal is offset and/or reduced. As a result, laser 210 may output a laser optical signal having substantially reduced phase noise in relation to when laser 210 does not receive the current. In some implementations, the frequency of the laser optical signal may vary at a particular rate (e.g., 100 MHz per milliamp (mA)) in response to the current in order to reduce and/or offset the phase noise.

In some implementations, the frequency of the laser optical signal may change over in time. In some implementations, the electrical signal, provided by PDs 235, may be indicative of the changes in the frequency of the laser optical signal as the frequency changes over time. Further, integrator 240 may produce a current that is opposite of the electrical signal provided by PDs 235 which may, in turn, be provided to laser 210 to reduce and/or offset phase noise as the frequency of the laser optical signal changes over time. In some implementations, the electrical signal, provided by PDs 235, may be indicative of a cumulative change in frequency (e.g., changes in frequency that accumulate over time).

In some implementations, integrator 240 may include a non-inverting amplification device (e.g., when the non-inverted electrical signal reduces phase noise produced by laser 210). Additionally, or alternatively, integrator 240 may include an additional invertor to convert an inverted electrical signal to a non-inverted electrical signal. For example, depending on the type of laser 210, the inverted electrical signal may cause an increase in phase noise instead of a decrease in phase noise. For such types of lasers 210, integrator 240 may provide a non-inverted electrical signal.

Modulator 250 may include an optical modulator, such as an electro-absorption modulator (EAM), a pair of nested Mach-Zender modulators (MZMs) for each polarization, or some other type of modulator. Modulator 250 may control (modulate) the intensity and phase of an input optical light (e.g., a signal supplied by laser 210 and provided via coupler 220 and waveguide 220-2), based on an input voltage signal associated with a data source (e.g., signals provided over TxCh1 through TxChN). Modulator 250 may be formed as a waveguide with electrodes for applying an electric field, based on the input voltage signal, in a direction perpendicular to the optical light. Alternatively, modulator 250 may be implemented based on other modulation technologies, such as electro-optic modulation.

SOA 260 may include an amplifying device or a collection of amplifying devices. In some implementations, SOA 260 may include an amplifier that may directly amplify an input optical signal (e.g., a signal supplied by laser 210 and provided via coupler 220 and waveguide 220-2). In some implementations, SOA 260 may be replaced by a variable optical attenuator (VOA), or by a component that combines both an SOA and a VOA.

As described above, optical transmitter 112 may include components that convert a portion of an optical signal, provided by laser 210, to an electrical signal which may be used to form a current that may be provided to laser 210 to reduce phase noise produced by laser 210. Thus, the output signal provided by SOA 260 may include substantially reduced phase noise in relation to when laser 210 does not receive the current.

In some implementations, optical transmitter 112 may include some other components used to convert a portion of an optical signal, provided by laser 210, to a current used to offset and/or reduce phase noise. For example, referring to FIG. 2B, optical transmitter 112 may include hybrid circuit 226 in lieu of interferometer 225. As further shown in FIG. 2B, optical transmitter 112 may include multiple photodiodes 235, analog-to-digital converters (ADCs) 236, angle component 238, and digital-to-analog convert (DAC) 239 (e.g., in addition to components described above with respect to FIG. 2A).

Figure 2B:
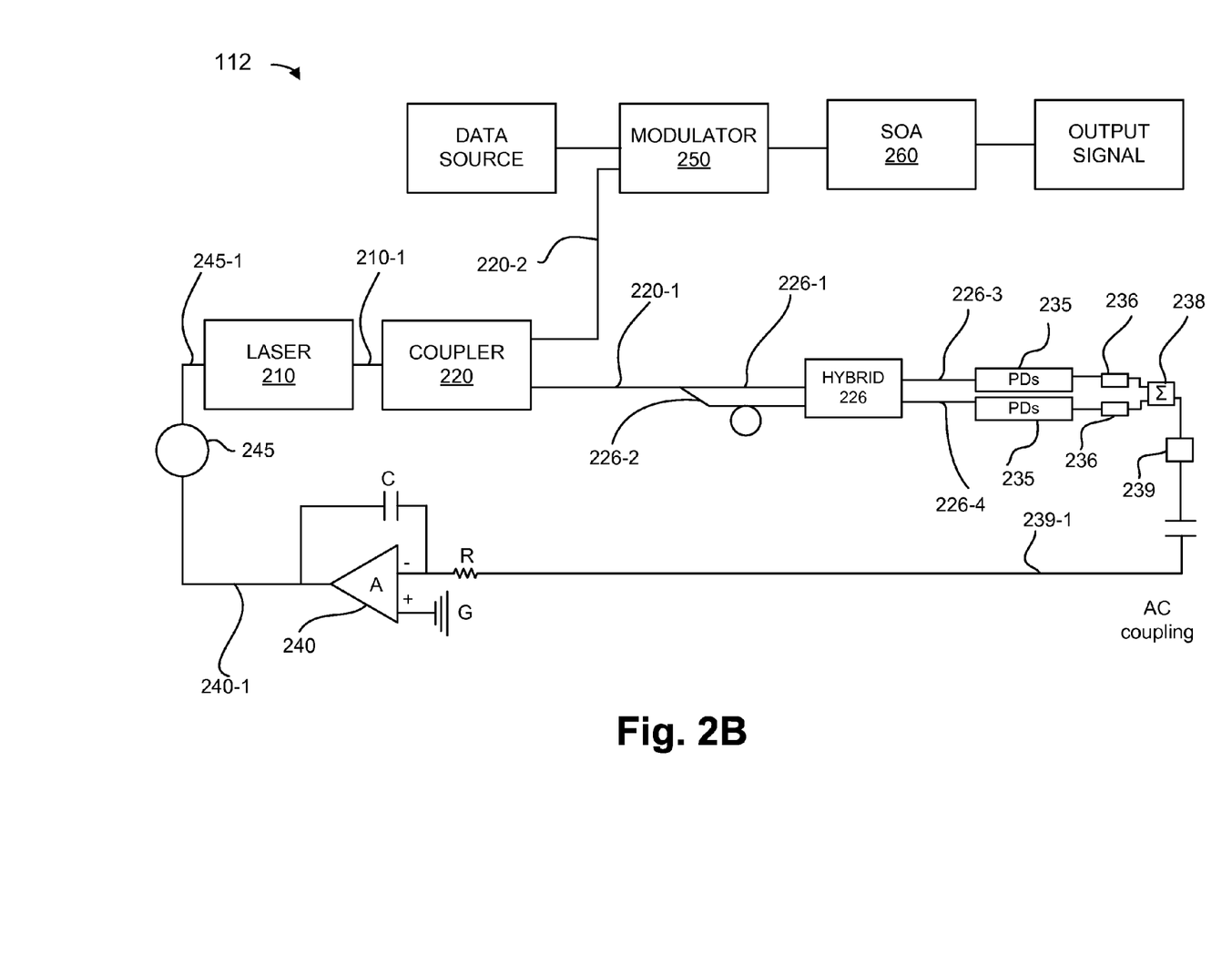

Hybrid circuit 226 may include a 90-degree hybrid circuit, or some other type of device to detect a change in frequency of an optical signal. In some implementations, hybrid circuit 226 may include waveguides 226-1 and 226-2. Similar to waveguides 225-1 and 225-2, waveguides 226-1 and 226-2 may each receive a portion of a laser optical signal provided by laser 210 via coupler 220 and waveguide 220-1. The portions of the laser optical signal may each propagate in waveguides 226-1 and 226-2 such that the portion of the laser optical signal that propagates in waveguide 226-2 is delayed relative to the portion of the laser optical signal that propagates in waveguide 226-1.

For example, as shown in FIG. 2B, waveguide 226-2 may include a looped portion (e.g., to increase the optical length of waveguide 226-2) such that the portion of the laser optical signal that propagates in waveguide 226-2 is delayed relative to the portion of the laser optical signal that propagates in waveguide 226-1. In some implementations, the delayed propagation may correspond to a frequency difference between the two portions of the laser optical signal. In some implementations, hybrid circuit 226 may supply real and imaginary components of the laser optical signal to two PDs 235 that may supply corresponding electrical signals to respective ADCs 236. In some implementations, hybrid circuit 226 may include a heater to adjust a length and/or a refractive index (and thus the optical length) of waveguide 226-1 and/or 226-2 (e.g., to cause a delay in propagation).

ADCs 236 may include analog-to-digital converters that convert electrical signals received from PDs 235 to corresponding digital signals. In some implementations, ADCs 236 may supply respective digital signals to angle component 238. In some implementations, angle component 238 may determine an angle associated with the respective digital signals.

Angle component 238 may include a digital signal calculation device. In some implementations, angle component 238 may provide a combined digital signal having the angle corresponding to a change in frequency (or a cumulative change in frequency) of the laser optical signal. In some implementations, angle component 238 may provide the combined digital signal to DAC 239.

DAC 239 may include a digital-to-analog converter to receive the combined digital signal and convert the combined digital signal to a corresponding electrical signal (e.g., an analog electrical signal). In some implementations, integrator 240 may receive the electrical signal (e.g., in a similar manner as described above with respect to FIG. 2A), invert and amplify the electrical signal, and provide the inverted electrical signal to controller 245 which may, in turn, provide a current, corresponding to the inverted electrical signal to laser 210 to offset and/or reduce phase noise associated with laser 210.

While FIGS. 2A-2B show optical transmitter 112 as including a particular quantity and arrangement of components, in some implementations, optical transmitter 112 may include additional components, fewer components, different components, or differently arranged components. For example, DAC 239 may be arranged to receive a digital signal from integrator 240 (e.g., when integrator 240 includes a digital amplifier).

Figure 3A:
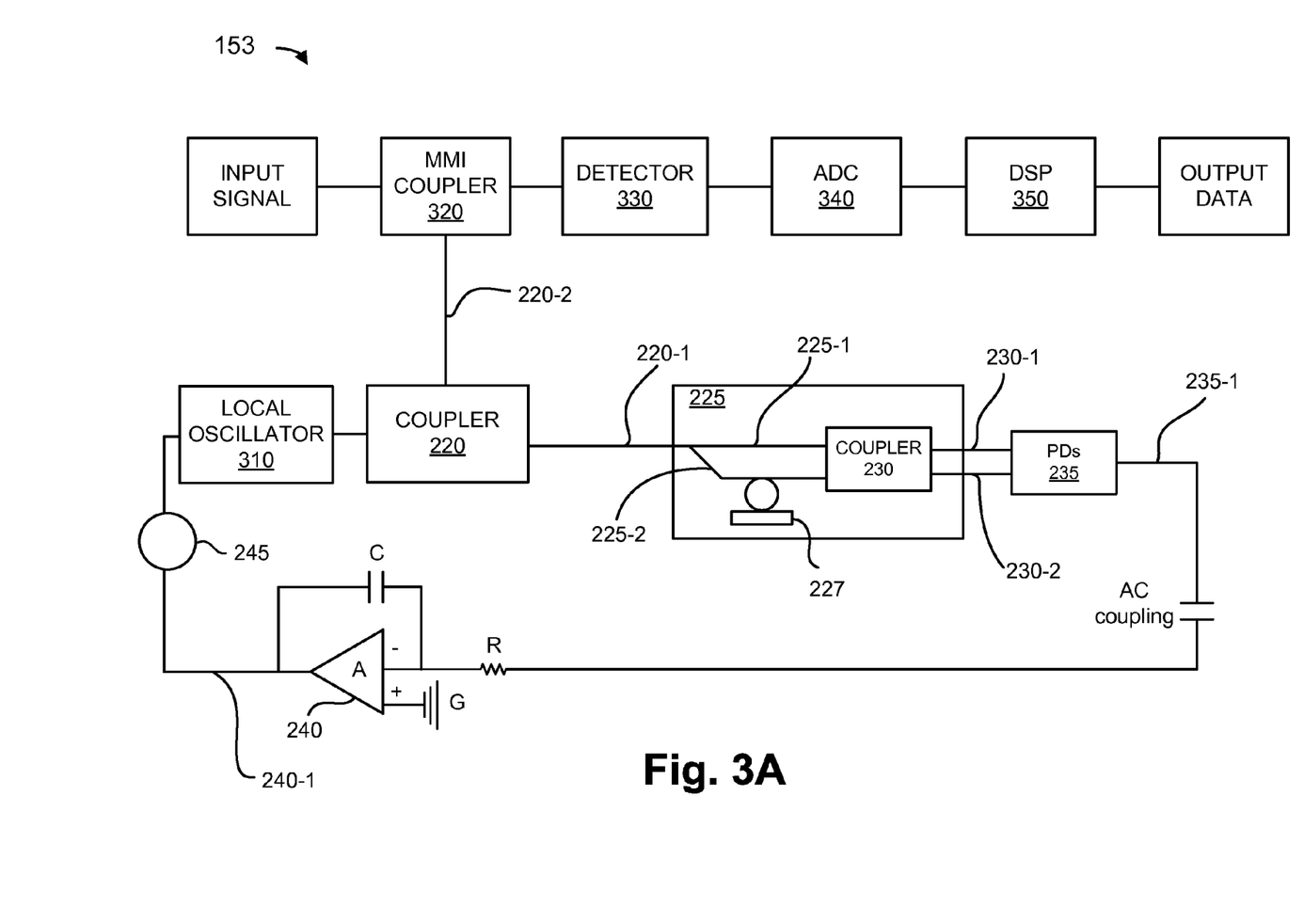
FIGS. 3A-3B are diagrams illustrating example components of an optical receiver as shown in FIG. 1.

FIG. 3A is a diagram illustrating example components of optical receiver 153 as shown in network 100 of FIG. 1. As shown in FIG. 3A, optical receiver 153 may include local oscillator 310, coupler 220, interferometer 225, PDs 235, integrator 240, controller 245, multimoded interference (MMI) coupler 320, detector 330, ADC 340, and/or DSP 350. In some implementations, components of optical receiver 153 may provide a feedback current to local oscillator 310 to reduce phase noise associated with an optical signal provided by local oscillator 310 (e.g., in a similar manner as described above with respect to FIGS. 2A-2B).

Local oscillator 310 may include a laser, a collection of lasers, or some other device. In some implementations, local oscillator 310 may include a laser to provide an optical signal (e.g., a local oscillator signal (hereinafter referred to as "LO signal")) to coupler 220, e.g., in a similar manner to that by which laser 210 provides an optical signal to coupler 220.

As shown in FIG. 3A, coupler 220 may receive the LO signal and may provide a portion of the LO signal to MMI coupler 320 for processing. Coupler 220 may provide another portion of the LO signal to interferometer 225 which may output first and second portions of a combined optical signal via waveguides 230-1 and 230-2 (e.g., in a similar manner as described above with respect to FIG. 2A). As further shown in FIG. 3A, PDs 235 may receive the first and second portions of the combined optical signal and may provide a corresponding electrical signal that may be indicative of a change in the frequency of the LO signal provided by local oscillator 310. As further shown in FIG. 3A, integrator 240 may receive the electrical signal provided by PDs 235 and may invert and amplify the electrical signal to produce an inverted electrical signal. In some implementations, controller 245 may process the inverted electrical signal to provide a corresponding current to local oscillator 310. In some implementations, the current may offset and/or reduce phase noise produced by local oscillator 310 (e.g., in a similar manner as described above).

MMI coupler 320 may include a 90-degree hybrid circuit and/or some other type of optical device. In some implementations, MMI coupler 320 may receive an input single (e.g., a signal channel supplied by optical demultiplexer 151) and/or an optical signal from local oscillator 310. In some implementations, MMI coupler 320 may supply multiple signals associated with the received signal channel and optical signal to detector 330.

Detector 330 may include a photodetector, such as a photodiode, to receive the output optical signal, from MMI coupler 320, and convert the output optical signal to corresponding voltage signals. In some implementations, optical receiver 153 may include multiple detectors for in-phase X-polarized signals, quad-phase X-polarized signals, in-phase Y-polarized signals, and quad-phase Y-polarized.

ADC 340 may include an analog-to-digital converter that converts the voltage signals from detector 330 to digital samples. ADC 340 may provide the digital signals to DSP 350.

DSP 350 may include a processing device, such as an application specific integrated circuit (ASIC), or some other type of processing device. DSP 350 may receive the digital signals from ADC 340 and may process the digital signals to form output data associated with the input signal received by MMI coupler 320.

As described above, optical receiver 153 may include components that convert a portion of an optical signal, provided by local oscillator 310, to an electrical signal which may be used to form a current to reduce phase noise produced by local oscillator 310. Thus, the output data signal provided by DSP 350 may include substantially fewer bit errors in relation to when local oscillator 310 does not receive the current.

In some implementations, optical receiver 153 may include some other components used to convert a portion of an optical signal, provided by local oscillator 310, to a current used to offset and/or reduce phase noise. For example, referring to FIG. 3B, optical receiver 153 may include hybrid circuit 226 in lieu of interferometer 225. As further shown in FIG. 3B, optical receiver 153 may include multiple photodiodes 235, ADCs 236, angle component 238, and DAC 239 (e.g., in addition to components described above with respect to FIG. 3A).

Figure 3B:
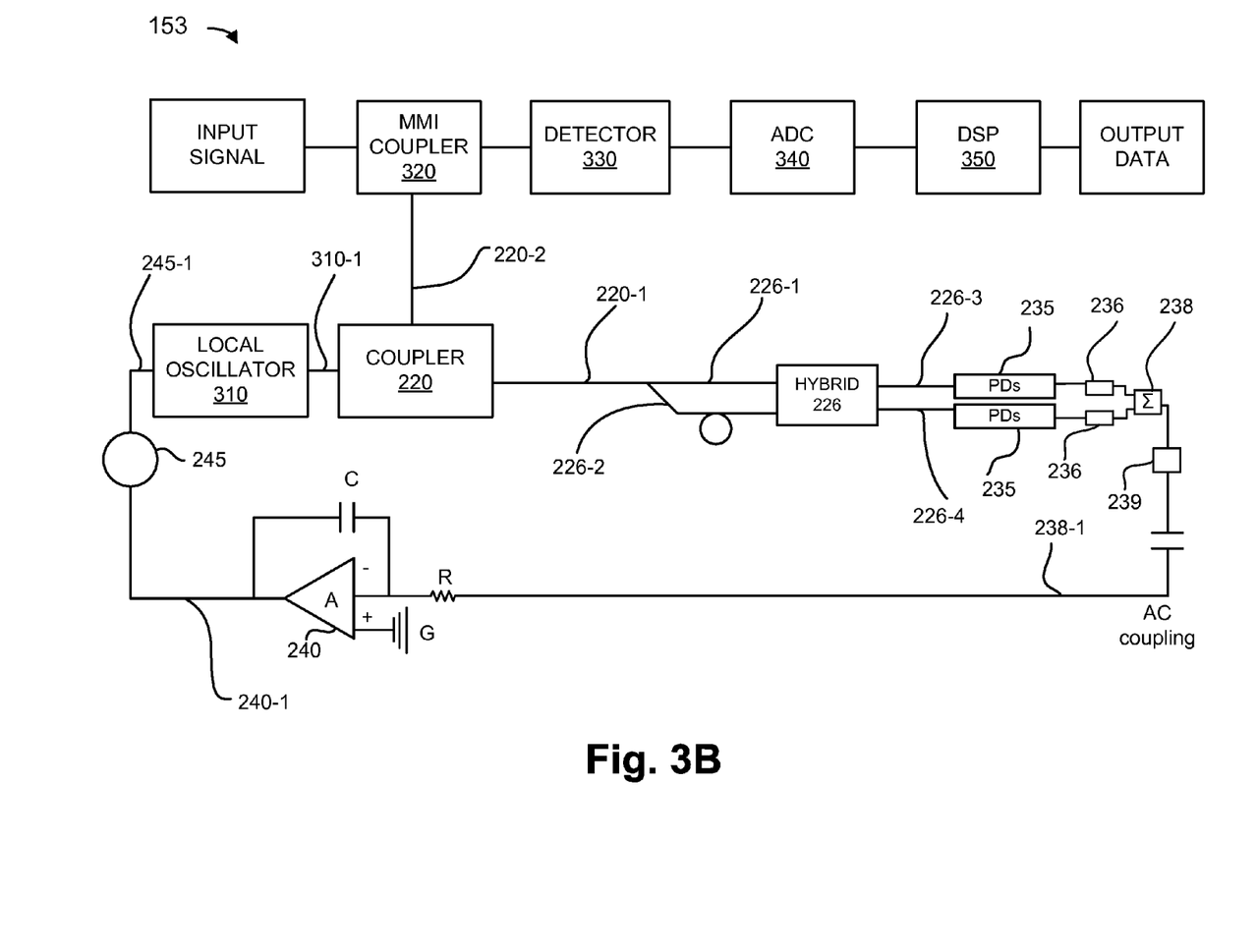

As described above with respect to FIG. 2B, hybrid circuit 226 may supply real and imaginary components of the LO signal to two PDs 235 that may supply corresponding electrical signals to respective ADCs 236 that convert electrical signals, received from PDs 235, to corresponding digital signals. In some implementations, ADCs 236 may supply respective digital signals to angle component 238. In some implementations, angle component 238 may determine an angle associated with the respective digital signals to provide a combined digital signal having the angle corresponding to a change in frequency of the LO signal. In some implementations, angle component 238 may provide the combined digital signal to DAC 239 to convert the combined digital signal to a corresponding electrical signal (e.g., an analog electrical signal).

Further, integrator 240 may receive the electrical signal, invert and amplify the electrical signal, and provide the inverted electrical signal to controller 245 which may, in turn, provide a current, corresponding to the inverted electrical signal to local oscillator 310 to offset and/or reduce phase noise associated with local oscillator 310.

While FIGS. 3A-3B show optical receiver 153 as including a particular quantity and arrangement of components, in some implementations, optical receiver 153 may include additional components, fewer components, different components, or differently arranged components.

Figure 4:
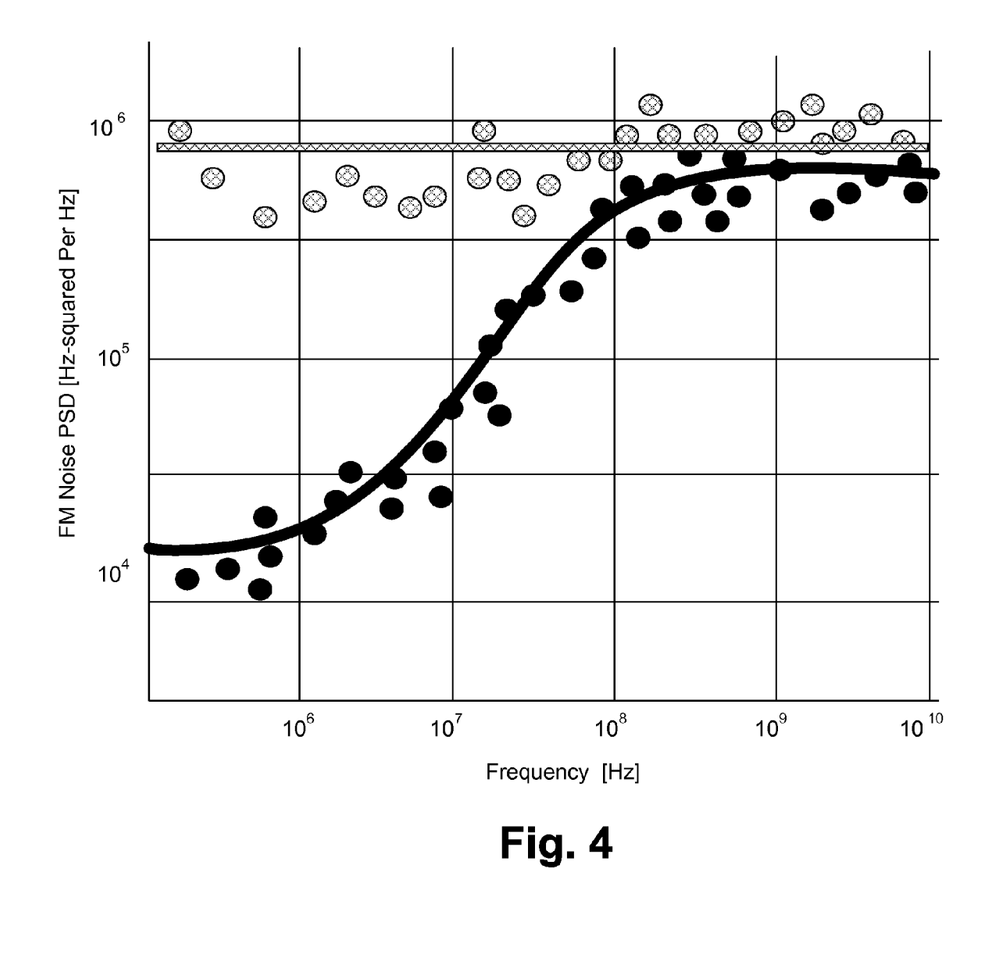
FIG. 4 is a graph illustrating example transmission characteristics of respective optical signals processed and not processed by phase noise reduction components described with respect to FIGS. 2A-3B.

FIG. 4 is a graph illustrating example transmission characteristics of respective optical signals processed and not processed by phase noise reduction components described with respect to FIGS. 2A-3B. In FIG. 4, frequency modulation (FM) power spectral density (PSD) noise for a first optical signal, such as an optical signal that is not processed by phase noise reduction components (e.g., components that provide a feedback current to an optical source, as described above), is represented by patterned data points. FM PSD noise for a second optical signal, such as an optical signal that is processed by phase noise reduction components, is represented by solid data points. As shown in FIG. 4, the phase noise for the second optical signal is reduced relative to the phase noise for the first optical signal for a particular frequency range. As described above, lower phase noise may correspond to fewer bit errors when an optical signal is processed by optical receiver 153.

While a particular example of transmission characteristics for optical signals is described with respect to FIG. 4, in practice, the transmission characteristics may vary from what is shown based on factors not described. For example, the second optical signal may exhibit a greater reduction in phase noise for a larger frequency range than what is shown in FIG. 4 based on link transmission characteristics, an amount of gain used in the feedback control loop associated with the optical source, and/or based on other factors.

Figure 5:
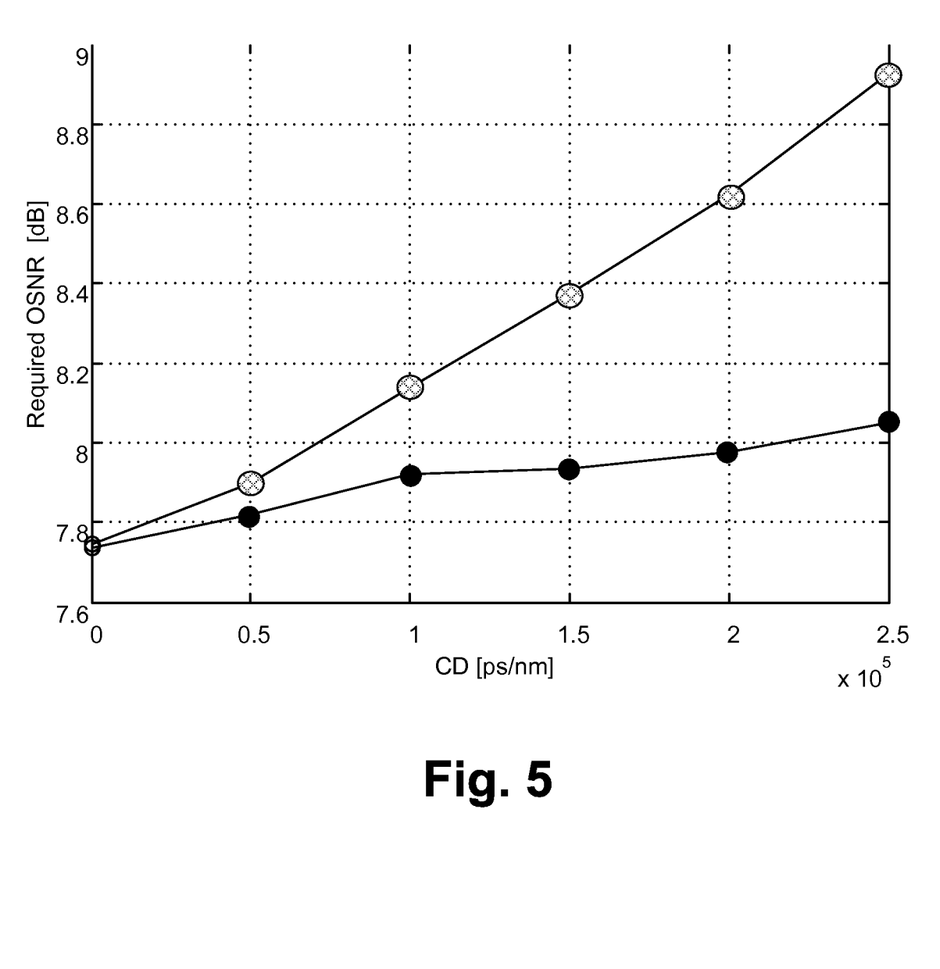
FIG. 5 is a graph illustrating example required optical signal-to-noise ratios (OSNR) for optical signals subject to chromatic dispersion compensation.

FIG. 5 is a graph illustrating example required optical signal-to-noise ratios (OSNR) for optical signals subject to chromatic dispersion compensation (e.g., required OSNR to maintain a given bit error ratio). In FIG. 5, a required OSNR for an first optical signal, such as an optical signal that is not processed by phase noise reduction components (e.g., components that provide a feedback current to an optical source, as described above), is represented by patterned data points. A required OSNR for a second optical signal, such as an optical signal that is processed by phase noise reduction components, is represented by solid data points. As a reference, the OSNR for both the first and second optical signals may be similar when no chromatic dispersion compensation is present.

As further shown in FIG. 5, the required OSNR for the first optical signal may rise substantially in relation to the required OSNR for the second optical signal as chromatic dispersion compensation increases. For example, the first optical signal may have a required OSNR of approximately 8.95 decibels (dB) when 2.5×10^5 picoseconds (ps)/nanometer (nm) of chromatic dispersion compensation is present. As shown in FIG. 5, the second optical signal may have a required OSNR of approximately 8.05 dB when the same chromatic dispersion compensation is present. In some implementations, OSNR may be inversely proportional to a distance that an optical signal may be transmitted. That is, a lower OSNR may allow an optical signal to be transmitted over a greater distance.

While a particular example of required OSNR for optical signals is described in FIG. 5, in practice, the required OSNR may vary from what is shown based on factors not described. For example, the second optical signal may have a lower required OSNR than what is shown in FIG. 5 based on link transmission characteristics and/or based on other factors.

As described above, an optical source (e.g., laser 210 and/or local oscillator 310) may provide an optical signal, a portion of which may be provided to interferometer 225 (or hybrid circuit 226) and converted into an electrical signal (e.g., via photodetectors) that may be indicative of a change in frequency of the optical signal provided by the optical source. In some implementations, integrator 240 and controller 245 may process the electrical signal to form a current that is provided to the optical source. In some implementations, the current may substantially reduce phase noise produced by the optical source when the current is provided to the optical source (e.g., to reduce bit errors when the optical signal is processed by optical receiver 153).

In some implementations, the phase noise may be reduced without a reduction in a line-width associated with the optical signal, thereby simplifying phase noise reduction in relation to when line-widths are reduced (which may exacerbate photonic integration).

The foregoing description provides illustration and description, but is not intended to be exhaustive or to limit the possible implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No component, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. An optical transmitter comprising:
   an optical source configured to provide a first optical signal,
      the first optical signal having a varying frequency;
   an optical circuit configured to receive a portion of the first optical signal and provide a second optical signal corresponding to a change in frequency of the first optical signal, the optical circuit is a 90-degree hybrid circuit;
   a photodetector configured to receive the second optical signal and provide an electrical signal that is indicative of the change in frequency of the first optical signal;
   an integrator configured to receive the electrical signal and provide an inverted electrical signal; and
   a controller configured to process the inverted electrical signal and provide a current, associated with the inverted electrical signal, to the optical source,
      the optical source reducing phase noise, associated with the first optical signal, based on the current.

2. The optical transmitter in accordance with claim 1, where the photodetector is one of a plurality of photodetectors,
   the plurality of photodetectors including a balanced pair of photodetectors.

3. The optical transmitter in accordance with claim 1, where the photodetector is alternating current (AC)-coupled to the integrator.

4. The optical transmitter in accordance with claim 1, where the optical circuit further including a delay-line interferometer.

5. The optical transmitter in accordance with claim 4, further comprising:
   a heater configured to adjust a temperature of the delay line interferometer.

6. The optical transmitter in accordance with claim 1, where the portion of the first optical signal is a first portion of the first optical signal,
   the optical transmitter further comprising:
   a coupler configured to receive the first optical signal and provide the first portion of the first optical signal to the optical circuit and provide a second portion of the first optical signal;
   a modulator configured to receive the second portion of the first optical signal and provided a modulated optical signal; and
   an amplifier configured to receive the modulated optical signal and provide an output signal to an optical multiplexer or to an optical receiver circuit.

7. An optical receiver comprising:
   an optical source configured to provide a first optical signal,
      the first optical signal having a varying frequency;
   an optical circuit configured to receive a portion of the first optical signal and provide a second optical signal corresponding to a change in frequency of the first optical signal, the optical circuit is a 90-degree hybrid circuit;
   a photodetector configured to receive the second optical signal and provide an electrical signal that is indicative of the change in frequency of the first optical signal;
   an integrator configured to receive the electrical signal and provide an inverted electrical signal; and
   a controller configured to process the inverted electrical signal and provide a current, associated with the inverted electrical signal, to the optical source,
      the optical source reducing phase noise, associated with the first optical signal, based on the current.

8. The optical receiver in accordance with claim 7, where the photodetector is one of a plurality of photodetectors,
the plurality of photodetectors including a balanced pair of photodetectors to receive first and second portions of the second optical signal and provide the electrical signal based on the first and second portions.

9. The optical receiver in accordance with claim 7, where the photodetector is alternating current (AC)-coupled to the integrator.

10. The optical receiver in accordance with claim 7, where the optical circuit further includes a delay-line interferometer.

11. The optical receiver in accordance with claim 10, further comprising:
a heater configured to adjust a temperature of the delay line interferometer.

12. An optical receiver comprising:
an optical source configured to provide a first optical signal,
the first optical signal having a varying frequency;
an optical circuit configured to receive a portion of the first optical signal and provide a second optical signal corresponding to a change in frequency of the first optical signal;
a photodetector configured to receive the second optical signal and provide an electrical signal that is indicative of the change in frequency of the first optical signal;
an integrator configured to receive the electrical signal and provide an inverted electrical signal; and
a controller configured to process the inverted electrical signal and provide a current, associated with the inverted electrical signal, to the optical source,
the optical source reducing phase noise, associated with the first optical signal, based on the current,
where the portion of the first optical signal is a first portion of the first optical signal,
the optical receiver further comprising:
a coupler configured to receive the first optical signal, provide the first portion of the first optical signal to the optical circuit, and provide a second portion of the first optical signal;
a multimoded interference (MMI) coupler configured to receive the second portion of the first optical signal and receive an input signal, provided by a transmitter circuit, the MMI coupler providing a component of the second portion of the first optical signal and a component of the input signal;
a detector configured to receive the component of the second portion of the first optical signal and the component of the input signal and output a corresponding electrical signal;
an analog-to-digital (ADC) converter to receive the corresponding electrical signal and convert the corresponding electrical signal to a corresponding digital signal; and
a digital signal processor (DSP) to receive the corresponding digital signal and process the corresponding digital signal provide output data associated with the corresponding digital signal.

13. An optical system comprising:
an optical transmitter comprising:
a first optical source configured to provide a first optical signal,
the first optical signal having a varying frequency;
a first optical circuit to receive a portion of the first optical signal and provide a second optical signal corresponding to a change in frequency of the first optical signal;
a first photodetector configured to receive the second optical signal and provide a first electrical signal that is indicative of the change in frequency of the first optical signal;
a first integrator configured to receive the first electrical signal and provide a first inverted electrical signal;
a first controller configured to process the first inverted electrical signal and provide a first current, associated with the first inverted electrical signal, to the first optical source,
the first optical source reducing phase noise associated with the first optical signal based on the first current; and
an optical receiver comprising:
a second optical source configured to provide a third optical signal,
the third optical signal having a varying frequency;
a second optical circuit to receive a portion of the third optical signal and provide a fourth optical signal corresponding to a change in frequency of the third optical signal;
a second photodetector configured to receive the fourth optical signal and provide a second electrical signal that is indicative of the change in frequency of the third optical signal;
a second integrator configured to receive the second electrical signal and provide a second inverted electrical signal; and
a second controller configured to process the second inverted electrical signal and provide a second current, associated with the second inverted electrical signal, to the second optical source,
the second optical source reducing phase noise associated with the third optical signal based on the second current.

14. The optical system in accordance with claim 13, where the first photodetector is one of a plurality of first photodetectors and the second photodetector is one of a plurality of second photodetectors,
the plurality of first photodetectors or the plurality of second photodetectors including a balanced pair of photodetectors.

15. The optical system in accordance with claim 13, where the first photodetector or the second photodetector is alternating current (AC)-coupled to the first integrator or the second integrator.

16. The optical system in accordance with claim 13, where the first optical circuit or the second optical circuit is a 90-degree hybrid circuit.

17. The optical system in accordance with claim 13, where the first optical circuit or the second optical circuit is a delay-line interferometer.

18. The optical system in accordance with claim 17, further comprising:
a heater configured to adjust a temperature of the delay-line interferometer.

* * * * *